US012584268B2

(12) United States Patent
 Kothari et al.

(10) Patent No.: US 12,584,268 B2
(45) Date of Patent: Mar. 24, 2026

(54) SYSTEM AND METHOD OF LAUNDRY SINGULATION AND FLATTENING

(71) Applicant: Mihir Kothari, Niles, IL (US)

(72) Inventors: Mihir Kothari, Niles, IL (US); Jeff Faye, Chicago, IL (US); Alexander Chan, Chicago, IL (US)

(73) Assignee: Mihir Kothari, Niles, IL (US)

( * ) Notice: Subject to any disclaimer, the term of this patent is extended or adjusted under 35 U.S.C. 154(b) by 272 days.

(21) Appl. No.: 18/466,412

(22) Filed: Sep. 13, 2023

(65) Prior Publication Data

US 2024/0084502 A1      Mar. 14, 2024

Related U.S. Application Data

(60) Provisional application No. 63/375,461, filed on Sep. 13, 2022.

(51) Int. Cl.

| | |
|---|---|
| *B25J 9/00* | (2006.01) |
| *B25J 9/16* | (2006.01) |
| *D06F 93/00* | (2006.01) |
| *D06F 95/00* | (2006.01) |
| *G06T 7/00* | (2017.01) |

(Continued)

(52) U.S. Cl.
CPC ............ *D06F 93/00* (2013.01); *B25J 9/0084* (2013.01); *B25J 9/0093* (2013.01); *B25J 9/1697* (2013.01); *D06F 95/00* (2013.01); *G06T 7/0004* (2013.01); *G06T 7/13* (2017.01); *G06T 7/90* (2017.01); *G06T 2207/10028* (2013.01); *G06T 2207/20164* (2013.01); *G06T 2207/30124* (2013.01)

(58) Field of Classification Search
CPC .......... D06F 93/00; D06F 95/00; D06F 67/04; B25J 9/0084; B25J 9/0093; B25J 9/1697; B25J 9/1682; G06T 7/0004; G06T 7/13; G06T 7/90; G06T 2207/10028; G06T 2207/20164; G06T 2207/30124; G05B 2219/39543; G05B 2219/40607; G05B 2219/40011
USPC ......................................................... 700/259
See application file for complete search history.

(56) References Cited

U.S. PATENT DOCUMENTS

| | | |
|---|---|---|
| 9,230,329 B2 | 1/2016 | Lukka |
| 9,908,152 B2 | 3/2018 | Sielermann et al. |
| 9,920,470 B2 | 3/2018 | Tautz et al. |

(Continued)

FOREIGN PATENT DOCUMENTS

| | | |
|---|---|---|
| DE | 102008028120 A1 | 12/2009 |
| EP | 3029195 A1 | 6/2016 |

*Primary Examiner* — Kira Nguyen
(74) *Attorney, Agent, or Firm* — Andrus Intellectual Property Law, LLP

(57) ABSTRACT

Systems and method of processing laundry include a first vision system configured to identify a first corner of the piece of laundry. A first end effector of a first robotic arm retains the first corner of the piece of laundry and suspends the piece of laundry from the first end effector. A second vision system is operable to identify a second corner of the piece of laundry. A second end effector of a second robotic arm is operable to retain the second corner of the piece of laundry. The first and second robotic arms are operable to suspend the piece of laundry from the first and second corners in an open condition, to lower a lower end of the piece of laundry, and to simultaneously release the first and second corners to drop the piece of laundry in a flattened condition.

17 Claims, 11 Drawing Sheets

(51) Int. Cl.
  G06T 7/13     (2017.01)
  G06T 7/90     (2017.01)

(56)                References Cited

U.S. PATENT DOCUMENTS

|  |  |  |  |  |
|---|---|---|---|---|
| 9,988,220 | B2 | 6/2018 | Sielermann et al. | |
| 10,029,852 | B1 | 7/2018 | Yang | |
| 10,647,526 | B1 | 5/2020 | Mohammed | |
| 2013/0168300 | A1 | 7/2013 | Malone et al. | |
| 2019/0184554 | A1 | 6/2019 | Yamazaki et al. | |
| 2019/0345664 | A1 | 11/2019 | Bringewatt et al. | |
| 2020/0224359 | A1* | 7/2020 | Bringewatt | B65H 7/14 |
| 2021/0122056 | A1* | 4/2021 | Menon | B25J 13/082 |
| 2021/0163237 | A1* | 6/2021 | Bringewatt | B65G 47/91 |
| 2021/0370517 | A1* | 12/2021 | Bixby | G06V 10/82 |
| 2022/0126452 | A1* | 4/2022 | Pennington | B25J 9/1682 |
| 2023/0028431 | A1 | 1/2023 | Kothari et al. | |
| 2023/0203747 | A1 | 6/2023 | Kothari et al. | |
| 2023/0381972 | A1* | 11/2023 | Tsuboi | B25J 13/082 |

* cited by examiner

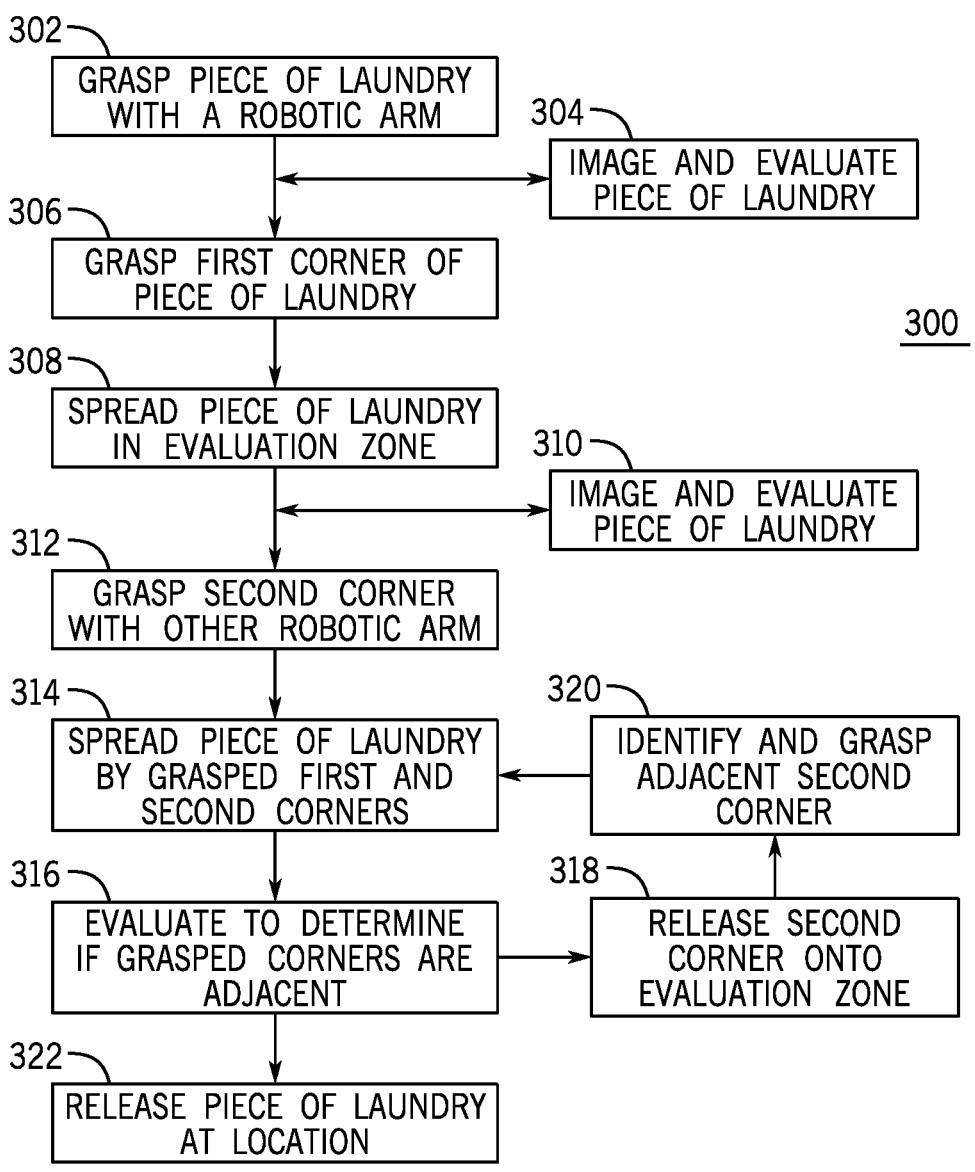

302 — GRASP PIECE OF LAUNDRY WITH A ROBOTIC ARM

304 — IMAGE AND EVALUATE PIECE OF LAUNDRY

306 — GRASP FIRST CORNER OF PIECE OF LAUNDRY

300

308 — SPREAD PIECE OF LAUNDRY IN EVALUATION ZONE

310 — IMAGE AND EVALUATE PIECE OF LAUNDRY

312 — GRASP SECOND CORNER WITH OTHER ROBOTIC ARM

314 — SPREAD PIECE OF LAUNDRY BY GRASPED FIRST AND SECOND CORNERS

320 — IDENTIFY AND GRASP ADJACENT SECOND CORNER

316 — EVALUATE TO DETERMINE IF GRASPED CORNERS ARE ADJACENT

318 — RELEASE SECOND CORNER ONTO EVALUATION ZONE

322 — RELEASE PIECE OF LAUNDRY AT LOCATION

FIG. 8

SYSTEM AND METHOD OF LAUNDRY SINGULATION AND FLATTENING

CROSS-REFERENCE TO RELATED APPLICATIONS

The present application claims priority of U.S. Provisional Patent Application No. 63/375,461, filed on Sep. 13, 2022, the contents of which is hereby incorporated by reference in entirety.

BACKGROUND

The present disclosure is related to the field of laundry. More specifically, the present disclosure relates to the automated evaluation and sorting of laundry.

Automated laundry systems provide for the cost-effective and ecologically efficient cleaning of soiled laundry. Food, beverage, and hospitality industries, as well as medical and dental fields, require the frequent washing of large volumes of laundry.

U.S. Pat. No. 9,908,152 discloses a method for sorting laundry items, in particular dirty laundry items. U.S. Pat. No. 9,920,470 discloses a method for capturing an item of laundry. U.S. Pat. No. 9,988,220 discloses a method and apparatus for feeding items of laundry to a mangle or to another laundry-treatment arrangement. U.S. Pat. No. 9,230,329 discloses a method, computer program, and apparatus for determining a gripping location. Each of these are incorporated by reference herein in their entirety.

BRIEF DISCLOSURE

An example of a system for processing laundry includes a singulate and flatten system. A first vision system is configured to acquire at least one image of a piece of laundry and the vision system is operable to identify a first corner of the piece of laundry. A first robotic arm includes a first end effector. The first robotic arm is operable to move the first end effector to retain the first corner of the piece of laundry and to suspend the piece of laundry from the first end effector. A second vision system is configured to acquire at least one image of the piece of laundry suspended from the first end effector. The second vision is system is operable to identify a second corner of the piece of laundry. A second robotic arm includes a second end effector. The second robotic arm is operable to move the second end effector to retain the second corner of the piece of laundry. The first and second robotic arms are operable to suspend the piece of laundry from the first and second corners in an open condition, to lower a lower end of the piece of laundry, and to simultaneously release the first and second corners to drop the piece of laundry in a flattened condition.

In examples of the system for processing laundry, the first end effector and the second end effector may be mechanical grippers. In examples of the system for processing laundry, the first vision system is configured to acquire a first plurality of images, create a first point-cloud from the plurality of images, and identify the first corner within the first point-cloud. The system operates to locate the first corner within a coordinate system for the first robotic arm and the first robotic arm is configured to move to position the first end effector at the first corner. The second vision system is configured to acquire a second plurality of images, create a second point-cloud from the plurality of images, and identify the second corner within the second point-cloud. A controller may be configured to locate the second corner within a coordinate system for the second robotic arm and configured to move the second robotic arm to position the second end effector at the second corner. A controller may be configured to locate the second corner within a coordinate system for the first robotic arm and configured to move the first robotic arm to position the second corner at the second end effector. The system may include a third vision system. The third vision system may be configured to acquire at least one image of the piece of laundry in the open position. The third vision system may be configured to evaluate a color or condition of the piece of laundry with analysis of the at least one image. A controller may be configured to operate the first or second robotic arm to divert the piece of laundry if the piece of laundry fails to pass a predetermined color or condition for the piece of laundry.

In further examples of the system for processing laundry, the product conveyor is configured to receive a pile of laundry thereon. The pile of laundry includes the piece of laundry. The product conveyor is configured to advance at least the piece of laundry in a first direction. A feed conveyor is positioned adjacent to and extends away from the product conveyor, wherein the first robotic arm and the second robotic arm are positioned between the product conveyor and the feed conveyor and the first and second arms are configured to simultaneously release the first and second corners to drop the piece of laundry in the flattened condition on the feed conveyor. The feed conveyor is configured to advance in a second direction, the second direction being different from the first direction. The first and second robotic arms are configured to lower the lower end of the piece of laundry to contact the feed conveyor. The feed conveyor pulls the lower end of the piece of the laundry in the second direction to place the piece of laundry in the flattened condition on the feed conveyor. The feed conveyor may be configured to direct the piece of laundry to a downstream processing machine comprising an ironing machine, a folding machine, or a stacking machine. The first vision system may be positioned above the product conveyor and is configured to acquire at least one image of the piece of laundry on the product conveyor. The first vision system may be pointed in a direction between +/−45 degrees of vertically downward at the product conveyor and the second vision system is pointed between +/−45 degrees of horizontal relative to the product conveyor.

In still further examples, a platform is positioned below the first vision system. The platform is configured to receive a pile of laundry comprising the piece of laundry. A feed conveyor may extend away from the platform, wherein the first robotic arm and the second robotic arm are positioned between the platform and the feed conveyor and the first and second arms are configured to simultaneously release the first and second corners to drop the piece of laundry in the flattened condition on the feed conveyor. A scoop may be positioned across the product conveyor at a location between the first vision system and an inlet end of the product conveyor configured to receive the pile of laundry.

Another example of a laundry processing system may include a plurality of feed conveyors and a plurality of singulate and flatten systems. Each feed conveyor of the plurality of feed conveyors extends away from the product conveyor and each singulate and flatten system of the plurality of singulate and flatten systems is positioned partially above an associated feed conveyor of the plurality of feed conveyors.

A method of processing laundry includes receiving a piece of laundry on a product conveyor. The piece of laundry is advanced in a first direction on the product conveyor. At least one image of the piece of laundry on the product conveyor is acquired. A first corner of the piece of laundry is identified from the acquired at least one image of the piece of laundry on the product conveyor. A first end effector of a first robotic arm is moved to retain the first corner of the piece of laundry. The piece of laundry is suspended by the first corner. At least one image of the piece of laundry suspended by the first corner is acquired. A second corner of the piece of laundry is identified from the acquired at least one image of the piece of laundry suspended by the first corner. The second corner of the piece of laundry is retained with a second end effector. The first end effector and the second end effector are separated to move the piece of laundry to an open position. The piece of laundry is lowered to a feed conveyor. The feed conveyor is configured to advance the piece of laundry in a second direction, the second direction being difference from the first direction. The first end effector and the second end effector release the piece of laundry to drop the piece of laundry onto the feed conveyor. In a further example of the method at least one image of the piece of laundry held in the open position is acquired. A color or condition of the piece of laundry is evaluated from the acquired at least one image of the piece of laundry held in the open position.

BRIEF DESCRIPTION OF THE DRAWINGS

FIG. 8 is a flow chart depicting a further example of a method of singulating and flattening.

DETAILED DISCLOSURE

Commercial laundry operations create efficiency through bulk processing of laundry, particularly of consumer-facing hospitality items including but not limited to bath towels, hand towels, sheets, napkins, tablecloths, or washcloths. In an automated laundry system and process, articles of laundry are cleaned as a batch of like items and/or colors. The washed items are dried, for example with the use of a mangle, which wrings water from the washed laundry. The clean laundry is then processed for delivery to the customer.

In some examples, the clean laundry is bagged for delivery to the customer. In other cases, additional processing is performed for the customer, for example ironing, folding, or stacking. These processes may be automated, however, automated processes require that the laundry be singulated and generally flattened for these processes to work. Co-pending US Patent Application Publication No. 2023/0028431 and US Patent Application Publication No. 2023/0203747 disclose related systems and methods of laundry sorting and are incorporated by reference herein in their entirety.

Figure 1:
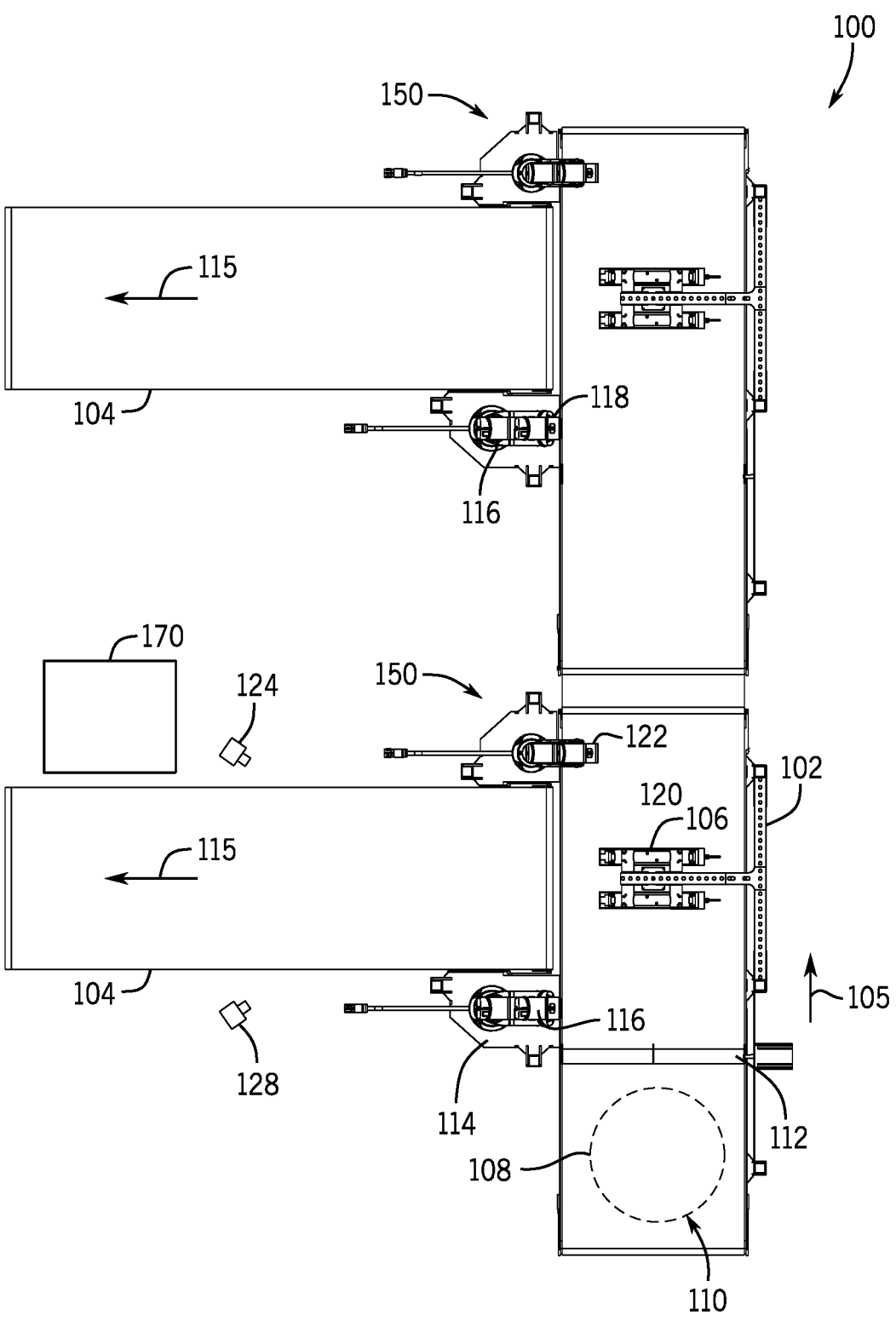
FIG. 1 depicts an example of a singulating and flattening system.
Figure 2:
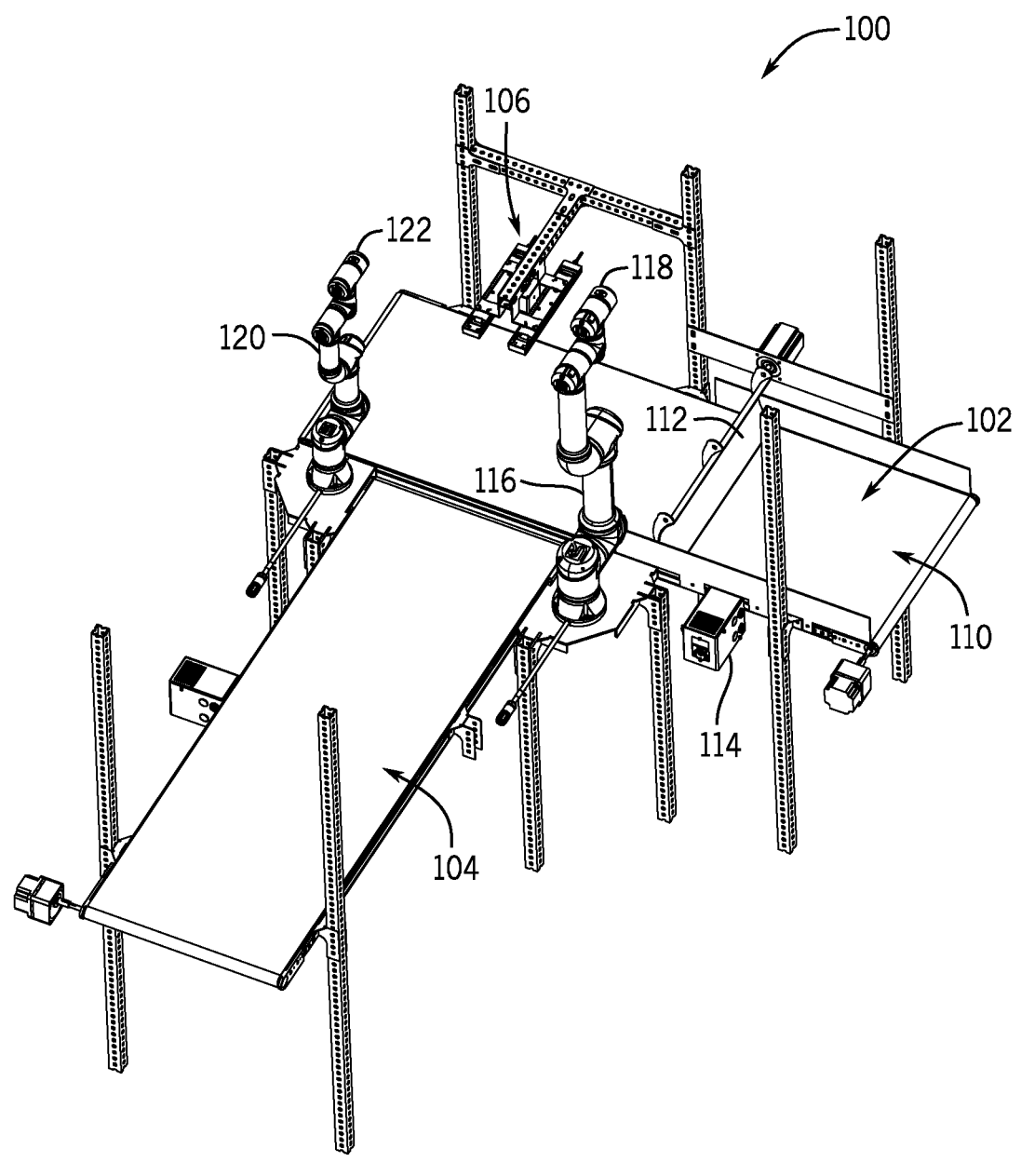
FIG. 2 is a side perspective view of an example of a singulating and flattening system.
Figure 3:
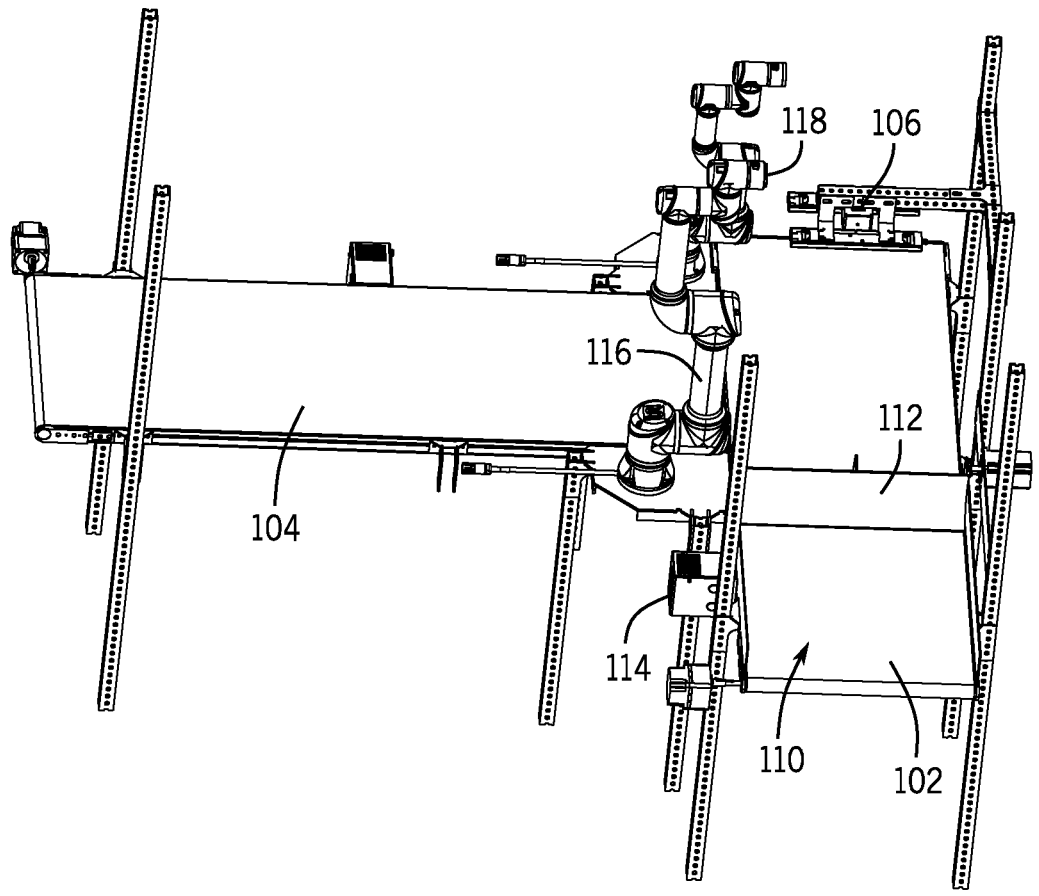
FIG. 3 is a front perspective view of an example of the singulating and flattening system.

FIG. 1 is a top or plan view of a system 100 for processing laundry. The system 100 exemplarily operates to singulate and flatten laundry and direct the singulated and flattened laundry to a further downstream process. FIGS. 2 and 3 present additional views of the system 100. The system 100 includes at least two conveyors. A product conveyor 102 receives a batch of the same laundry item, e.g. all bath towels, napkins, or sheets. The laundry is exemplarily in a pile 108 at an inlet end 110 of the product conveyor 102. The product conveyor 102 operates to advance the laundry generally in the direction of arrow 105. It will be recognized that the product conveyor 102 may be implemented with one or more conveyors, and may be linear or other configurations as described herein. One or more feed conveyors 104 are arranged relative to the product conveyor 102. The one or more feed conveyors 104 may extend perpendicular to the product conveyor 102 or may be oriented at an alternative angle. The one or more feed conveyors 104 operate to receive individual pieces of the laundry from the product conveyor 102 and direct the individual pieces of laundry generally in the direction of arrow 115 to deliver the individual pieces of laundry to a further downstream processing machine, for example, an ironing, folding, or stacking machine (not depicted).

A singulate and flatten system 150 is arranged relative to the product conveyor 102 and the feed conveyor 104. The singulate and flatten system 150 transfers pieces of laundry from the product conveyor 102 to the feed conveyor 104. The singulate and flatten system 150 includes a vision system 106 positioned above an evaluation zone 107, which is exemplarily on the product conveyor 102. The vision system 106, as described in further detail herein, includes a camera that is pointed downwards in the direction of the product conveyor 102 at the evaluation zone 107. Examples of vision systems may use any of a variety of sensors, including but not limited to RGB light sensors, laser, IR, LiDAR, RADAR, or ultrasound. It will be recognized from the present disclosure that any of these sensors may be used within the disclosed vision systems while remaining within the scope of the present disclosure. In examples, the vision system, and exemplarily, the camera of the vision system 106 is pointed in a direction between +/−45 degrees of vertically downward at the product conveyor. The vision system 106 operates to analyze any laundry on the product conveyor 102 passing below the vision system 106 within this field of view. The vision system 106 operates to detect a corner of a piece of laundry from the laundry on the product conveyor 102.

It will be recognized that as the product conveyor 102 moves the pile of laundry 108 forward, the laundry may stay in a pile or may spread out along the conveyor 102. Optionally, a scoop 112, for example in the shape of an incline or an arc, may extend across the product conveyor 102 prior to the vision system 106 to loosen or separate the pieces of laundry. As will be explained in further detail herein, multiple singulate and flatten systems 150 may be arranged along the product conveyor 102 to provide parallel lines of laundry items directed to downstream processing machines. Additionally, as a piece of laundry is removed from the product conveyor 102 by a singulate and flatten system 150, the remaining laundry on the product conveyor 102 is dispersed or separated, improving detection and singulation of a piece of laundry by a subsequent singulate and flatten system 150.

The singulate and flatten system 150 further includes one or more controllers 114 that are communicatively connected to the components as described herein, including the vision system 106. The functions and operations of the controller in combination with these and other components is described. The controller is exemplarily a single board computer (SBC) or a central processing unit (CPU), that includes a processor. The processor of controller may be integral with or communicatively connected to a computer-readable medium upon which computer-readable code is stored. Upon execution of the computer-readable code by the processor, the processor performs functions and calculations and subsequently transmits control signals as described herein.

The vision system 106 includes an optical sensor, which may be a camera. The vision system 106 acquires one or more images of the laundry below the vision system 106 on the product conveyor 102. An example of a camera is an iRVision 3D system with a 3DV Sensor available from FANUC America Corp. of Rochester Hills, Michigan, USA, and the associated software and firmware used to operate this camera system and to provide analysis of the images captured thereby. This software and firmware may be stored with and executed by the controller 114. It will be recognized that this is merely exemplary and not limiting on the optical sensor, which may also include lasers, IR or other imaging modalities.

The vision system 106, which may itself include its own dedicated computer or controller, in connection with the controller 114, exemplarily creates a point-cloud from the one or more images of the laundry. The vision system 106 identifies a corner of a piece of laundry in the point-cloud. In an example, the vision system identifies the highest-confidence corner within the current view of the vision system 106. Corner detection may include detection of edges or discontinuity within the point-cloud. The vision system may further be trained with examples and images of corners to assist in detection. In alternative examples, the vision system 106 may use image recognition and or an artificial intelligence system trained with a set of images identifying laundry corners of varying degrees of certainty of identification.

Figure 4:
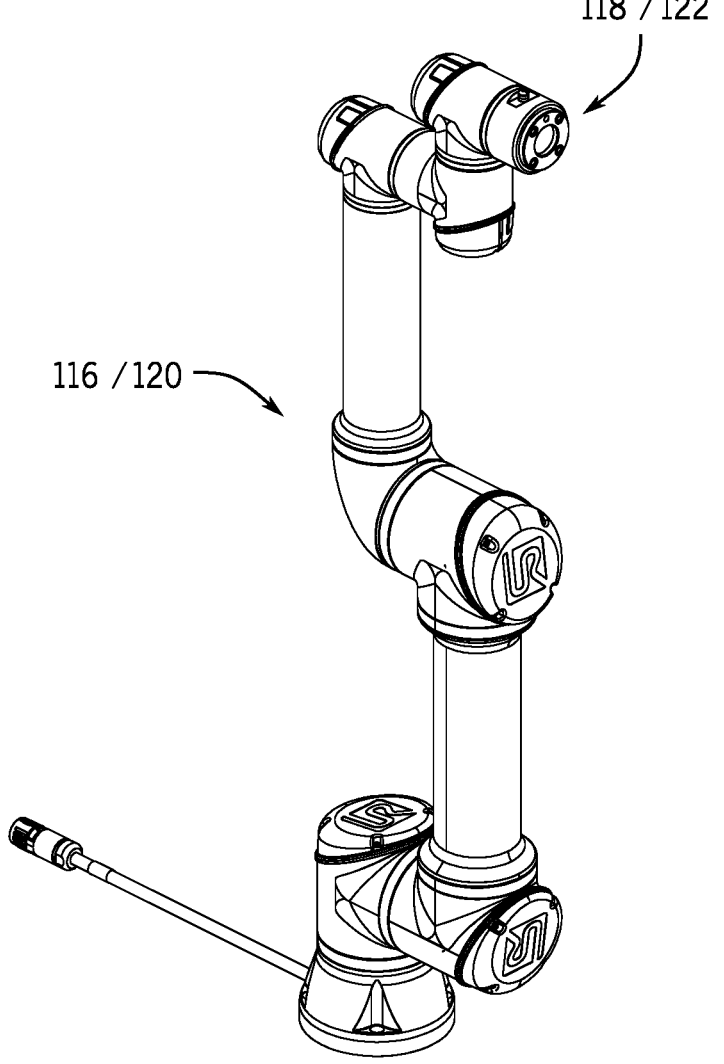
FIG. 4 is a perspective view of an example of a robotic arm which may be used in the singulating and flattening system.

Once a corner is identified, the controller 114 provides coordinate instructions to a first robotic arm 116 to direct a first end effector 118 to the identified corner, for example within the 3D coordinate system of the point-cloud. In another example, the controller 114 may operate the robotic arm 116 within a separate coordinate system, and the point-cloud from the vision system 106 is translated to the controller 114 and robotic arm 116 coordinate system. The first end effector 118 may be a gripper, for example, a mechanical claw, or a vacuum system or other type of end effector as may be recognized in view of the present disclosure. The first end effector 118 is operated to acquire the identified corner. In the case of a gripper or mechanical claw end effector, actuation may be closing, while a vacuum system end effector may actuate to provide suction. Acquiring the identified corner may further include vertically lifting the acquired corner of the piece of laundry from the product conveyor 102. In a non-limiting example, the product conveyor 102 may be operated to advance at this time to help facilitate singulation of the piece of laundry and position the piece of laundry for identification of a second corner. The first robotic arm 116, is then operated to move from a first position 116A operatively above the product conveyor 102, from which the item of laundry was acquired, to a second position 116B operatively above the feed conveyor 104 and proximate to a second robotic arm 120 with a second end effector 122. FIG. 4 is an isolated view of an example of a robotic arm. The robotic arm may exemplarily be a multiple-axis robot that uses CNC or other coordinate control for articulation.

With the first robotic arm 116 moved to the second position 116B, the piece of laundry is vertically suspended from the first end effector 118 by the acquired corner. A second vision system 124 is arranged to analyze the piece of laundry suspended in this position. The second vision system 124, or exemplarily a camera of the vision system 124, is pointed generally horizontally so as to acquire an image of the generally vertically suspended piece of laundry. In a further example, the second vision system and/or a camera of the second vision system is arranged at an angle between +/−45 degrees of horizontal relative to the product conveyor. In an example, the second vision system operates in the manners as described above to identify a second corner of the piece of laundry that is adjacent to the first corner. In the example of a square piece of laundry (e.g. a napkin or washcloth), there will be two adjacent corners equidistant from the first corner. In the example of a rectangular piece of laundry (e.g. a bath towel, hand towel, or a twin-sized bed sheet), there will be one adjacent corner closest to the first corner. The second vision system 124 identifies a second corner of the piece of laundry. The controller 114 provides coordinate instructions, for example in reference to a point cloud of the piece of laundry generated by the second vision system 124 or within a separate coordinate system of the controller 114, to the second robotic arm 120 and to the second end effector 122 to operate the second robotic arm 120 and the second end effector to grasp the identified second corner. In another example, the second end effector may be stationary (e.g. a mechanical claw at a fixed location. With the second corner identified by the second vision system 124, the first robotic arm 116 may be moved under instruction from the controller 114 to position the second corner of the piece of laundry to be grasped by the second end effector 122 at the fixed location.

Figure 5:
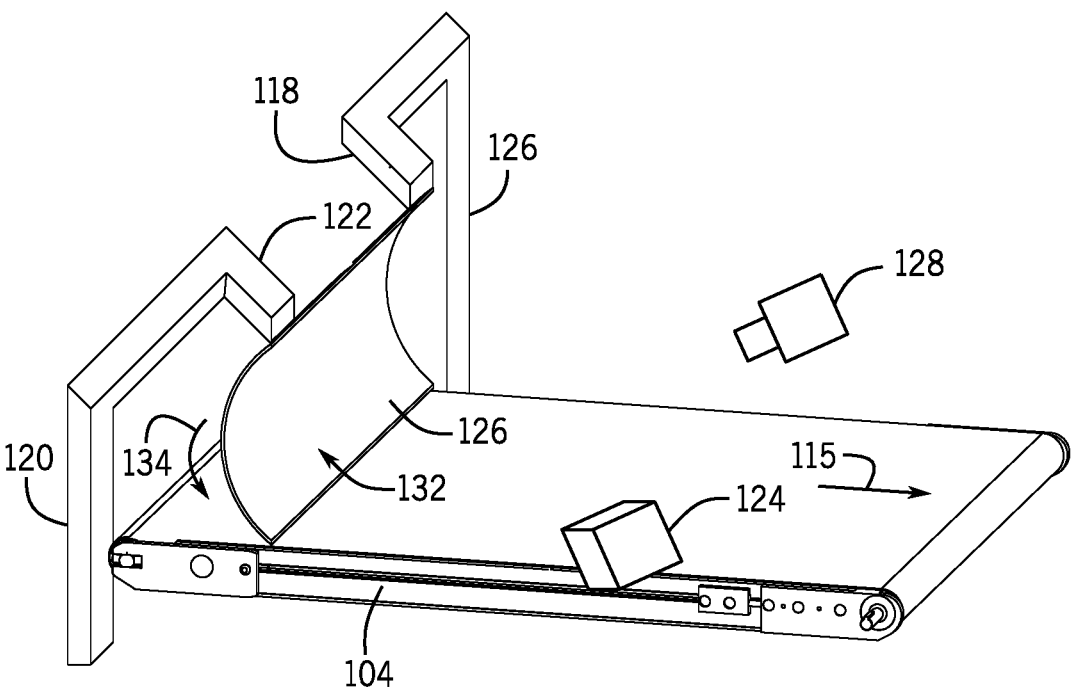
FIG. 5 is a side view of a product conveyor.

With two corners of the piece of laundry, one or both of the first end effector 118 and the second end effector 122 are moved by the controller 114 to separate the corners of the piece of laundry held by the first end effector 118 and the second end effector 122. relative movement separating the first end effector 118 from the second end effector 122, opens or spreads out the piece of laundry suspended by the two grasped corners. FIG. 5 is a side perspective view of a feed conveyor 104 with the end effectors of the first robotic arm 116 and the second robotic arm 120 holding a piece of laundry 126 suspended in an open or spread out position. A third vision system 128 may be directed at the piece of laundry 126 held in this position. The third vision system 128 operates to evaluate a condition of the piece of laundry. The third vision system 128 may exemplarily be a camera that acquires an image of the piece of laundry 126. It will be recognized that while second vision system 124 and third vision system 128 are depicted as separate devices, in other examples, these may be combined into a single vision system that operates to both detect the second corner of the piece of laundry 126 and also to evaluate the condition of that piece of laundry 126.

The image of the piece of laundry acquired by the third vision system 128 may be evaluated by the controller 114 to evaluate a color and a condition of the piece of laundry. In an example, an acceptable range of color of the piece of laundry is predetermined and stored in a memory of the controller 114. The acceptable range of color of the piece of laundry may be stored as a range of pixel color values identified within the image of the piece of laundry. The controller 114 may further evaluate the image for regions of color discontinuity, for example to determine streaking or localized staining in the piece of laundry. Such evaluation may include calculating a gradient of pixel color values and applying edge detection processing to identify regions of color discontinuity. The evaluation may be identification of pixels or a predetermined number or percentage of pixels against a color value threshold. The evaluation may further include an identified maximum or minimum pixel color value in the image against predetermined maximum or minimum values. In examples, a plurality of images may be acquired and an average or composite of the acquired images used in the evaluation. Additionally, the controller 114 evaluates the at least one image acquired by the third vision system 128 to evaluate the condition of the piece of laundry. In an example, the controller 114 may apply an image processing algorithm trained with supervised learning from one or more datasets of sample images representing various types of damaged laundry. In an example, the training dataset or datasets may be specific to a particular type of laundry to be evaluated (e.g. towels, napkins, pillow cases or sheets) while in other cases the one or more training datasets may include images generalized across multiple types of laundry and/or similar types of laundry. The training data may provide labeled examples of fraying, holes, or tears. In examples, these may be used through supervised learning to create models of particular types of damage to which the acquired at least one image is compared, in still further examples, the damage may be further identified using edge detection and identifying discontinuities in the image of the item of laundry. In still further examples, a light source (not depicted) may illuminate the piece of laundry 126 with white light, or may use particular bands of wavelengths of visible or invisible (e.g. ultraviolet or infrared) energy. In examples, the additional light may enhance the imaging or evaluation of the piece of laundry.

It will be recognized that if the piece of laundry fails the evaluation due to damage or staining, that the piece of laundry 126 may be diverted from the product conveyor 104. In an example one or both of the first and second robotic arms 116, 120 may operate to move the piece of laundry to a discard bin 117 positioned adjacent to the product conveyor 104, it is to be recognized that the position of the discard bin 117 in FIG. 1 is merely exemplary and not limiting on locations in which the discard bin 117 may be placed.

For a piece of laundry 126 that passes the evaluation, the piece of laundry 126, now singulated by the first robotic arm 116 and the second robotic arm 120, is flattened by inter-action between the first and second robotic arms 116, 120 and the product conveyor 104. The product conveyor 104 advances in the direction of arrow 115. In an example, the product conveyor 104 operates to continuously advance in this direction. With the piece of laundry 126 suspended from upper corners by the respective first end effector 118 and the second end effector 122, a lower end 132 of the piece of laundry 126 is a free end that hangs down away from the end effectors. As the lower end 132 of the piece of laundry 126 comes into contact with the product conveyor 104, friction between the product conveyor 104 and the piece of laundry 126 draws the lower end 132 of the piece of laundry 126 in the direction of arrow 134. This may be further facilitated by operation of the first and second robotic arms 116, 120 to lower the grasped corners towards the product conveyor. The product conveyor 104 continues to draw the lower end 132 away from the first and second robotic arms 116, 120 in the direction of arrow 134, increasing a generally horizontal distance along the product conveyor 104 between the lower end 132 of the piece of laundry 126 and first and second robotic arms 116, 120. The end effectors 118, 122 are next operated to simultaneously release the grasped corners. With the grasped corners released, the rest of the piece of laundry 126 falls generally flat on the product conveyor 104. The contact of the lower end 132 on the product conveyor 104 and the movement of the conveyor in the direction of arrow 115 facilitate the flattening of the piece of laundry 126. In examples, the product conveyor 104 may be horizontal, while in other examples, the product conveyor 104 may be angled at an incline away from the feed conveyor 102. An inclined angle of the product conveyor 104 may assist in drawing of the lower end 132 of the piece of laundry 126 in the direction of arrow 134 to facilitate flattening of the piece of laundry 126.

After release of the piece of laundry 126, the feed conveyor 104 directs the piece of laundry to a subsequent processing machine, exemplarily an ironing, folding, or flattening machine (not depicted). At least the first robotic arm 116 returns to the first position 116A, and the vision system 106 operates to identify a corner of a subsequent piece of laundry on the product conveyor 102 to singulate and flatten.

Referring back to FIG. 1, the above description has provided for the operation of the singulate and flatten system 150 to singulate and flatten a single piece of laundry 126. It will be recognized that multiple pieces of laundry, for example, starting as a pile 108 may be located on the product conveyor 102. In one example, the product conveyor 102 advances the pile 108 to a position below the first vision system 106, and the system 150 operates to singulate and flatten each piece of laundry from the pile 108. In other examples, the system 100 includes multiple feed conveyors 104 and associated singulate and flatten systems 150 including the vision systems and robotic arms described above. In such an example, the product conveyor 102 may slowly advance the pieces of laundry, and a first singulate and flatten system 150 operates to process pieces of laundry off of the product conveyor 102. The product conveyor 102 may continuously advance the pile 108 of laundry sequentially past one or more singulate and flatten systems 150. The product conveyor 102 may incrementally advance, for example, in fixed distances with fixed dwell times between advancement operations. In a still further example, the singulate and flatten systems 150 may be evenly spaced and the product conveyor 102 operates to advance a pile 108, to a subsequent singulate and flatten system 150 when a new pile 108 is detected at the inlet end 110 of the product conveyor 102, and/or exemplarily when a subsequent singulate and flatten system 150 is identified to not currently have a pile 108 of laundry positioned below an associated vision system 106. It is recognized, for example with a continuously advancing product conveyor 102, that the product conveyor 102 may move multiple pieces of laundry past a first singulate and flatten system 150 faster than the first singulate and flatten system 150 can process such pieces of laundry. The product conveyor 102 may be operated to continue to move the pieces of laundry to a second (and subsequent) singulate and flatten system 150 that operates to place pieces of laundry on a second (and subsequent) feed conveyor 104.

Figure 6:
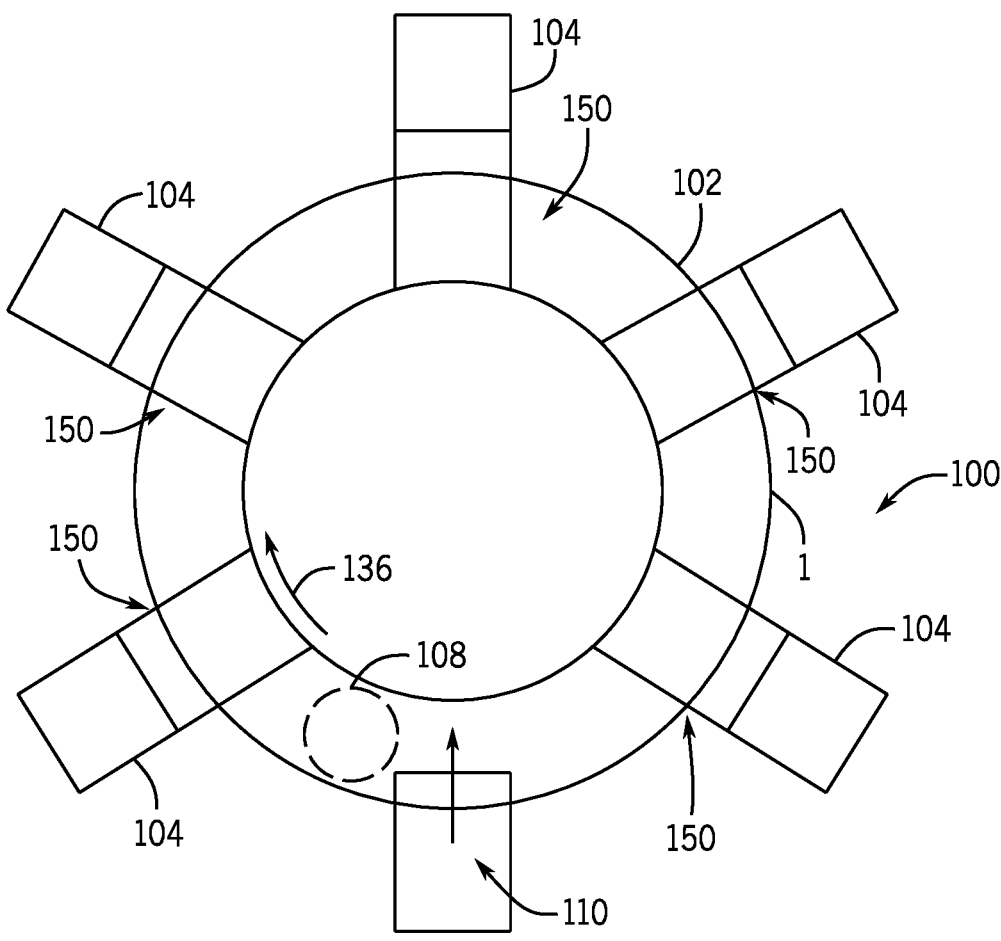
FIG. 6 is depicts a further example of a singulating and flattening system.

FIG. 6 is a system diagram that takes this example a step further. In FIG. 6, the product conveyor 102 is arranged in a circle, oval, or carousel. The inlet end 110 may exemplarily be an inlet conveyor, configured to receive a pile of laundry and deposit the pile 108 of laundry onto the product conveyor 102. Alternatively, the laundry may be deposited directly onto the product conveyor 102. The product conveyor 102 advances the pile 108 of laundry in the direction of arrow 136. This moves the laundry on the product conveyor 102 sequentially past a plurality of singulate and flatten systems 150, each configured to place singulated and flattened pieces of laundry on an associated feed conveyor 104. The feed conveyors 104 exemplarily extend radially away from the circular product conveyor 102. In an example, the product conveyor 102 can be loaded with laundry and the laundry will move about the system continuously past the sequential plurality of singulate and flatten systems 150 until all of the laundry has been removed from the product conveyor 102.

Figure 7:
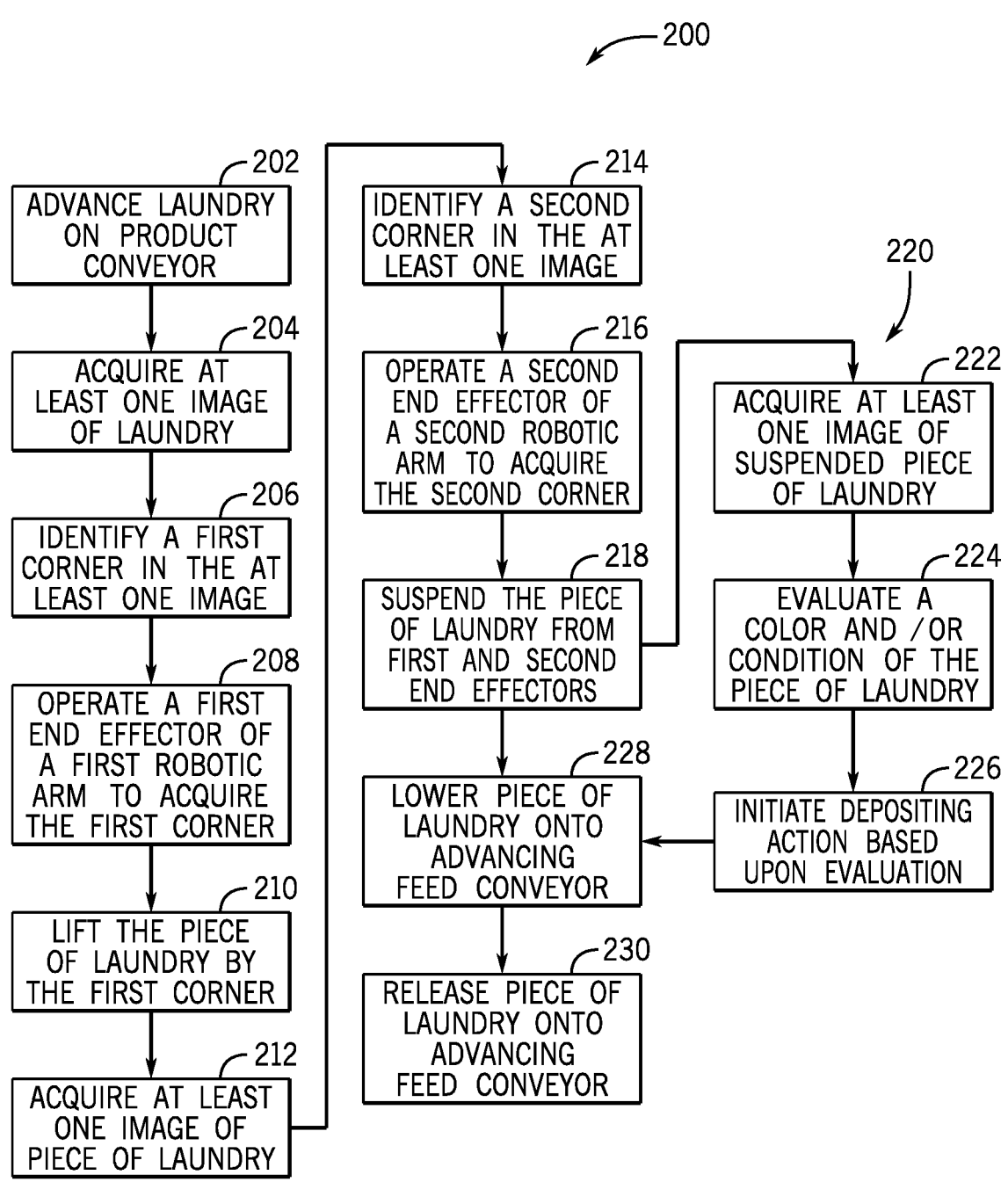
FIG. 7 is a flow chart depicting an example of a method of singulating and flattening.

FIG. 7 is a flow chart that depicts an example of a method 200 of singulating and flattening laundry, for example, but not limited to, using the system described above. It will be recognized that other methods may have more or fewer steps than those as shown in FIG. 7 while remaining within the scope of the present disclosure, including all of the features and operations of the examples of the system provided above with respect to FIGS. 1-6.

The method 200 starts with laundry on a product conveyor. The product conveyor advances the laundry at 202 and at 204, a vision system acquires at least one image of the laundry. As explained above, the vision system processes the at least one image to identify a first corner of a piece of laundry in the at least one image. This includes using the point-cloud analysis as described above, but is not limited to this technique, and may exemplarily include image recognition or edge detection techniques as well.

At 206 a first end effector of a first robotic arm is operated to acquire the first corner of a piece of laundry identified in the at least one image. The robotic arms and end effectors may include those as described above. It will be recognized that different end effectors present different manners of acquiring a corner of the piece of laundry. For example, gripping fingers, rollers, or gears may physically entrap a portion of the corner between structures, while a suction device may produce a localized vacuum to retain a portion of the corner. Once acquired, the corner of the piece of laundry is lifted at 210 from the product conveyor. This singulates the piece of laundry from other pieces of laundry on the product conveyor. The piece of laundry may be lifted completely off of the product conveyor and may also be moved to be above or generally above a feed conveyor arranged transverse to the product conveyor.

At 212 at least one image of the lifted piece of laundry is acquired. The at least one image acquired at 212 is analyzed at 214 to identify a second corner in the at least one image acquired at 212. In a rectangular or square piece of laundry, the corners adjacent to the corner held by the first end effector have expected locations relative to the held corner and the shape of the piece of laundry thus suspended. With this additional information, the second corner may be identified in manners as previously described. At 216 a second end effector of a second robotic arm is operated to acquire the identified second corner. With two adjacent corners acquired, the first end effector and the second end effector may be moved relatively apart to spread out the piece of laundry. This facilitates the remaining flattening actions as described herein, but also facilitates the optional evaluation of the piece of laundry.

Optionally, at 220 a sub-method may be performed to evaluate a quality and/or condition of the piece of laundry. At 222 at least one image is acquired of the piece of laundry suspended by the first and second end effectors. With the laundry spread out by the relative separation of the first and second end effectors, the piece of laundry is presented for a full view of the piece of laundry to be acquired for evaluation. At 224 the at least one image of the piece of laundry is analyzed to evaluate the piece of laundry for a color and/or condition of the piece of laundry. US Patent Application Publication No. 2023/0028431 and US Patent Application Publication No. 2023/0203747, which are already incorporated by reference herein, provide additional disclosure regarding the evaluation of the color and/or condition of a piece of laundry, which is considered to be part of the present disclosure. At 226 a dispositive action is initiated based upon the evaluation of the color and/or condition of the piece of laundry. The dispositive action may be to move the piece of laundry to a bin or hamper for laundry items to be removed from circulation e.g. due to staining or wear. The dispositive action may be to approve the piece of laundry and the method continues to 228.

At 228, the piece of laundry is lowered onto an advancing feed conveyor. The piece of laundry is lowered by the first and second end effectors lowering in position in a direction towards the feed conveyor. The feed conveyor is advancing in a direction away from the product conveyor and the first and second robotic arms. By lowering the piece of laundry towards the feed conveyor, a free end of the piece of laundry contacts the feed conveyor and is drawn away from the end effectors of the robotic arms by friction between the piece of laundry and the feed conveyor. This flattens the piece of laundry. The end effectors release the piece of laundry at 230 and the first and second corners fall onto the advancing feed conveyor to flatten the piece of laundry.

FIG. 8 is a flow chart that depicts a still further example of a method 300 of singulating and flattening laundry. It will be recognized that the method 300 may be performed using the system 150 as described above, or may be performed with a system having more, fewer, or alternative components as may be recognized from the disclosure herein. A pile 108 of laundry may be positioned in proximity of a robotic arm 116, 120, and the robotic arm 116, 120 is operated to grasp any portion of a single piece of laundry from the pile at step 302. In an example, a vision system captures one or more images of the pile 108 of laundry. The computer system creates a point-cloud of the pile of laundry from the one or more images. The computer system then identifies a peak in the point-cloud. In an example, the peak of the point-cloud is identified as the geometrically closest point of the point-cloud to a reference point R, for example within a 3D coordinate system. The reference point may exemplarily be a point R above the surface upon which the pile is positioned, a portion of the vision system, or another point of reference. The controller provides coordinate instructions to the robotic arm 116, 120 to move the end effector 118, 122 for example within the 3D coordinate system to the identified peak in the point-cloud. The end effector 118, 122 is operated to close on the peak or at a predetermined position relative to the identified peak to grasp the piece of laundry.

The piece of laundry is then moved by the robotic arm 116, 120 to an evaluation zone 107 wherein a vision system 106 acquires at least one image of the piece of laundry at 304. The at least one image is evaluated, for example in the manners as described above, to identify a corner of the piece of laundry. A robotic arm operates to grasp the identified corner of the piece of laundry at 306.

Figure 9:
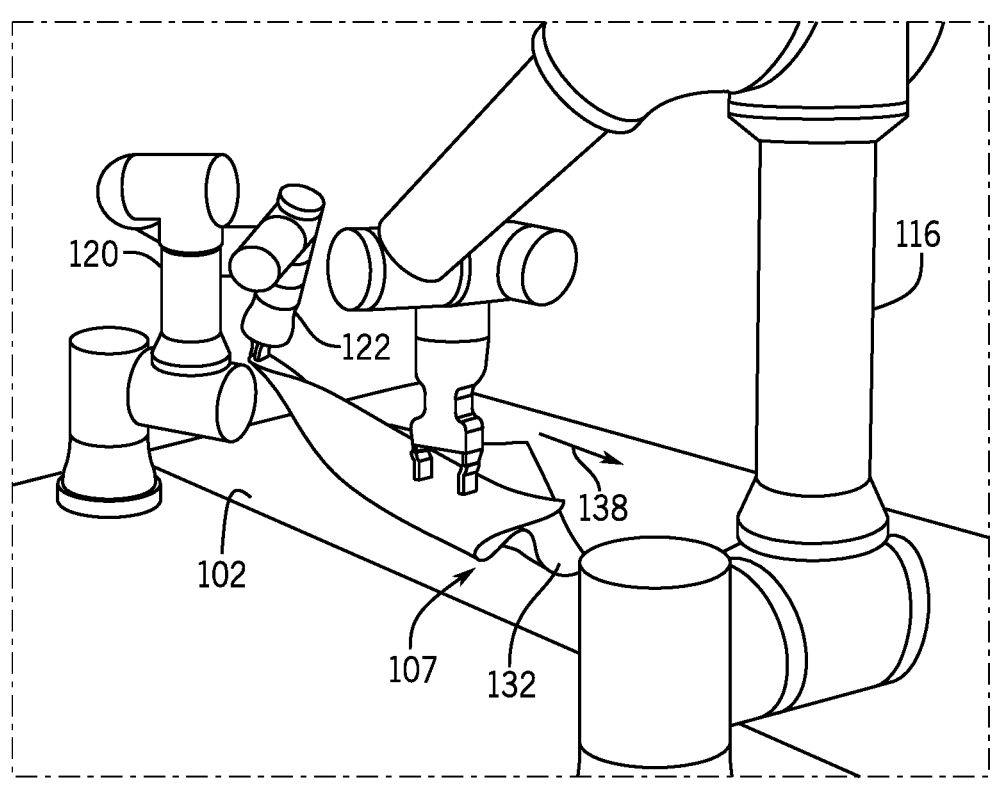
FIG. 9 depicts an example of the singulating and flattening system spreading a piece of laundry in the evaluation zone.
Figure 10:
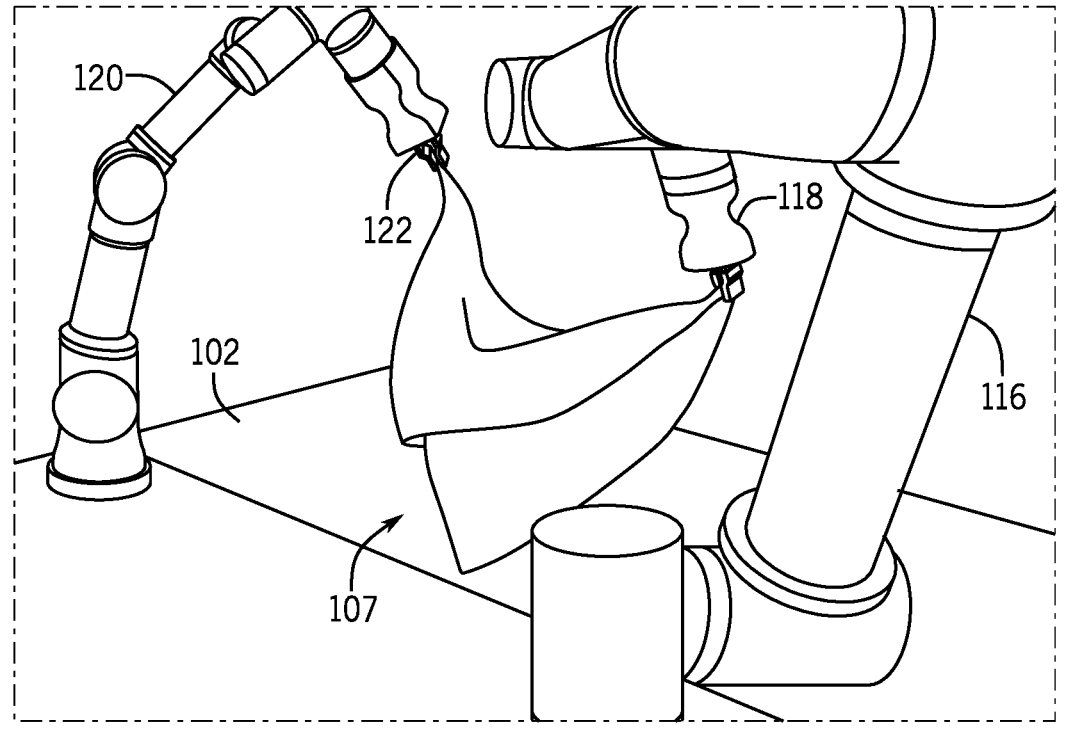
FIG. 10 depicts an example of the singulating and flattening system spreading a piece of laundry by two corners.

At 308, the piece of laundry is spread out in the evaluation zone 107 while being held by a first corner of the piece of laundry. This may be done by first, lifting the piece of laundry by this first corner and lowering it back into the evaluation zone. This is exemplarily depicted at FIG. 9. In an example that includes a conveyor 102, a conveyor may advance to catch a free end 132 of the piece of laundry by friction and pull the free end in the direction of advancement of the conveyor 138. With the piece of laundry suspended from the first corner, the free end hangs down away from the end effector. Contact between the free end and the conveyor causes friction that draws the free end away from the first corner. The robotic arm may further facilitate this by moving in a direction opposite the direction of travel of the conveyor. This spreads the piece of laundry out in the evaluation zone from the first corner. At least one image of the piece of laundry in this position is acquired and evaluated at 310 to identify a second corner, for example in the manners as described above. At 312, the other robotic arm 116, 120 is operated to grasp a second corner. At 314 the first and second robotic arms operate to lift the item of laundry by the grasped first and second corners and spread the piece of laundry. In an example, a blower positioned relative to the first and second arms may operate to blow air past the item of laundry, to help spread the item of laundry for evaluation. At 316 the item of laundry is evaluated as described above with use of the vision system to determine if adjacent corners of the item of laundry are grasped. FIG. 10 depicts an example of the item of laundry spread for evaluation and with two non-adjacent corners grasped.

Figure 11:
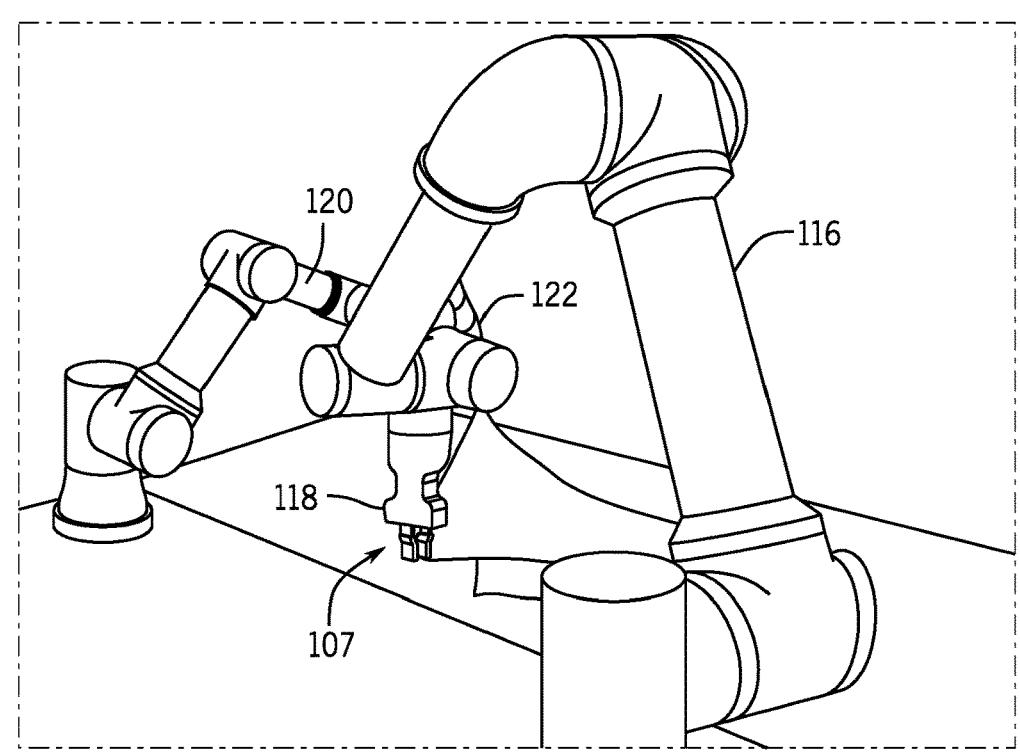
FIG. 11 depicts an example of the singulating and flattening system grasping a second adjacent corner.

If two non-adjacent corners are grasped, as depicted in FIG. 10, then at 318, the second corner of the piece of laundry is released by the other robotic arm onto the evaluation zone 107, for example as depicted in FIG. 11. From this position, at least one image of the piece of laundry is acquired and an adjacent second corner is identified, for example as described above with the use of the vision system. With an adjacent second corner identified, the other robotic arm is operated to grasp the adjacent second corner at 320, as is also depicted in FIG. 11.

Figure 12:
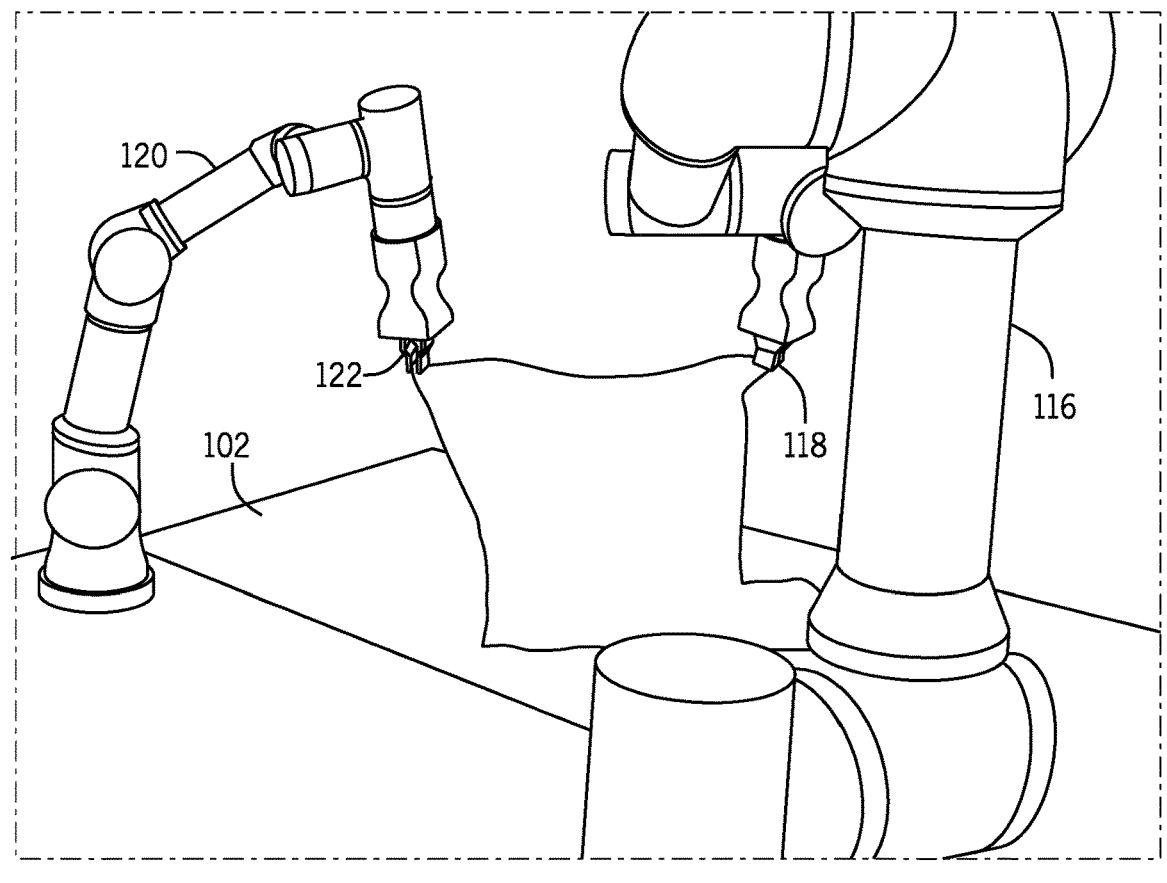
FIG. 12 depicts an example of the singulating and flattening system spreading a piece of laundry by adjacent corners.
Figure 13:
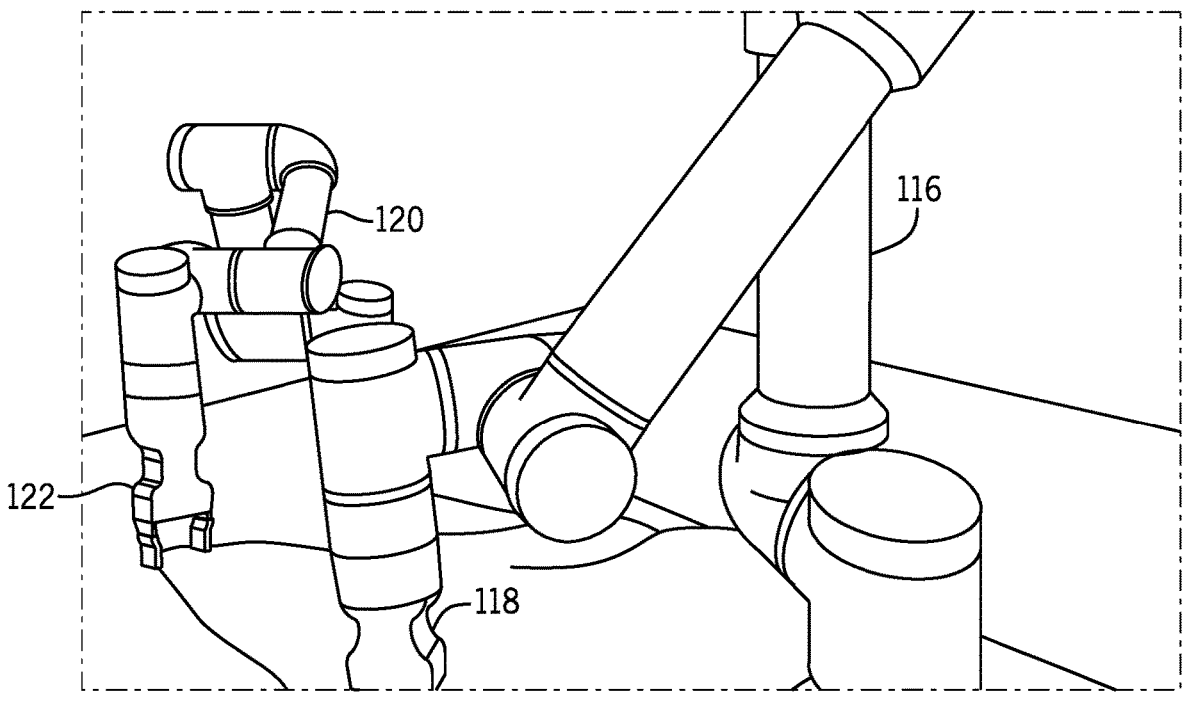
FIG. 13 depicts an example of the singulating and flattening system releasing a piece of laundry at a location.

The method returns to 314, but this time, when the piece of laundry is spread by the robotic arms, for example as depicted in FIG. 12, the system is able to confirm that two adjacent corners are grasped. Upon confirmation that two adjacent corners are grasped, the first and second robotic arms are operated at 322 to bring the grasped end of the piece of laundry to a destination location. Once at this location, the first and second robotic arms are operated to release the item of laundry to lay the item of laundry out onto the location. The location is exemplarily adjacent to the product conveyor. This is exemplarily depicted in FIG. 13. The location may be a feed conveyor as described above or may be a stationary table.

In a still further example, a version of the singulate and flatten system 150 may operate without a product conveyor 102. In such a version, the pile 108 of laundry may be positioned in an evaluation zone 107 below the vision system 106 and the first robotic arm 116 operated to grasp a piece of laundry from the pile 108 thus positioned, rather than off of the product conveyor 102.

The systems and methods described above have been done so with respect to the evaluation and sorting of clean laundry. It will be recognized that applications may exist in which such systems and methods may be used in the processing and/or sorting of dirty laundry or elsewhere intermediate to a laundry cleaning process.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for processing laundry with singulating and flattening, the system comprising:

a first vision system configured to acquire at least one image of a piece of laundry and operable to identify a first corner of the piece of laundry;

a first robotic arm comprising a first end effector, the first robotic arm operable to move the first end effector to retain the first corner of the piece of laundry and to suspend the piece of laundry from the first end effector;

a second vision system configured to acquire at least one image of the piece of laundry suspended from the first end effector, and operable to identify a second corner of the piece of laundry from the at least one image of the piece of laundry suspended from the first end effector;

a second robotic arm comprising a second end effector, the second robotic arm operable to move the second end effector to retain the second corner of the piece of laundry;

a product conveyor configured to receive a pile of laundry thereon, the pile of laundry comprising the piece of laundry, the product conveyor configured to advance at least the piece of laundry in a first direction;

a feed conveyor adjacent to and extending away from the product conveyor, the feed conveyor configured to advance in a second direction, the second direction being different from the first direction, wherein the first robotic arm and the second robotic arm are positioned between the product conveyor and the feed conveyor, the first and second robotic arms are operable to suspend the piece of laundry from the first and second corners in an open condition, to lower a lower end of the piece of laundry to contact the feed conveyor, the feed conveyor pulls the lower end of the piece of the laundry in the second direction to place the piece of laundry in a flattened condition on the feed conveyor,, and the first and second arms are configured to simultaneously release the first and second corners to drop the piece of laundry in the flattened condition on the feed conveyor.

2. The system of claim 1, wherein the first end effector and the second end effector are mechanical grippers.

3. The system of claim 1, wherein the first vision system is configured to acquire a first plurality of images, create a first point-cloud from the plurality of images, and identify the first corner within the first point-cloud.

4. The system of claim 3, further comprising a controller configured to locate the first corner within a coordinate system for the first robotic arm and the first robotic arm is configured to move to position the first end effector at the first corner.

5. The system of claim 3, wherein the second vision system is configured to acquire a second plurality of images, create a second point-cloud from the plurality of images, and identify the second corner within the second point-cloud.

6. The system of claim 5, further comprising a controller configured to locate the second corner within a coordinate system for the second robotic arm and configured to move the second robotic arm to position the second end effector at the second corner.

7. The system of claim 5, further comprising a controller configured to locate the second corner within a coordinate system for the first robotic arm and configured to move the first robotic arm to position the second corner at the second end effector.

8. The system of claim 1, further comprising a third vision system, wherein the third vision system is configured to acquire at least one image of the piece of laundry in the open position, and the third vision system is configured to evaluate a color or condition of the piece of laundry with analysis of the at least one image.

9. The system of claim 8, further comprising a controller configured to operate the first or second robotic arm to divert the piece of laundry if the piece of laundry fails to pass a predetermined color or condition for the piece of laundry.

10. The system of claim 1, further comprising:

a platform positioned below the first vision system, wherein the platform is configured to receive a pile of laundry comprising the piece of laundry;

wherein the feed conveyor extends away from the platform.

11. The system of claim 1, wherein the feed conveyor is configured to direct the piece of laundry to a downstream processing machine comprising an ironing machine, a folding machine, or a stacking machine.

12. The system of claim 1, wherein the first vision system is positioned above the product conveyor and is configured to acquire at least one image of the piece of laundry on the product conveyor.

13. The system of claim 12, wherein the first vision system is pointed in a direction between +/−45 degrees of vertically downward at the product conveyor and the second vision system is pointed between +/−45 degrees of horizontal relative to the product conveyor.

14. The system of claim 11, further comprising a scoop positioned across the product conveyor at a location between the first vision system and an inlet end of the product conveyor configured to receive the pile of laundry.

15. The system for processing laundry of any of claim 1, further comprising:

a plurality of feed conveyors, the plurality of feed conveyors comprising the feed conveyor; and a plurality of singulate and flatten systems, the plurality of singulate and flatten systems comprising the singulate and flatten system;

wherein each feed conveyor of the plurality of feed conveyors extends away from the product conveyor and each singulate and flatten system of the plurality of singulate and flatten systems is positioned partially above an associated feed conveyor of the plurality of feed conveyors.

16. A method of processing laundry, the method comprising:

receiving a piece of laundry on a product conveyor;

advancing the piece of laundry in a first direction on the product conveyor;

acquiring at least one image of the piece of laundry on the product conveyor;

identifying a first corner of the piece of laundry;

moving a first end effector of a first robotic arm to acquire the first corner of the piece of laundry;

suspending the piece of laundry by the first corner;

acquiring at least one image of the piece of laundry suspended by the first corner;

identifying a second corner of the piece of laundry;

acquiring the second corner of the piece of laundry with a second end effector;

separating the first end effector and the second end effector to move the piece of laundry to an open position suspended from the first and second end effectors at an upper end of the piece of laundry; and lowering the piece of laundry to a feed conveyor, the feed conveyor adjacent to and extending way from the product conveyor, the feed conveyor configured to advance the piece of laundry in a second direction, the second direction different from the first direction, to contact the feed conveyor with a lower end of the piece of laundry opposite the upper end;

pulling the lower end of the piece of laundry in the second direction to place the piece of laundry in a flattened condition on the feed conveyor; and simultaneously releasing the first end effector and the second end effector to drop the piece of laundry onto the feed conveyor in the flattened condition.

17. The method of claim 16, further comprising:

acquiring at least one image of the piece of laundry held in the open position; and evaluating a color or condition of the piece of laundry from the at least one image of the piece of laundry held in the open position.

\* \* \* \* \*